Feb. 2, 1954    J. C. BREGAR    2,667,970
AUTOMATIC LIMIT BRIDGE
Filed Sept. 1, 1948.
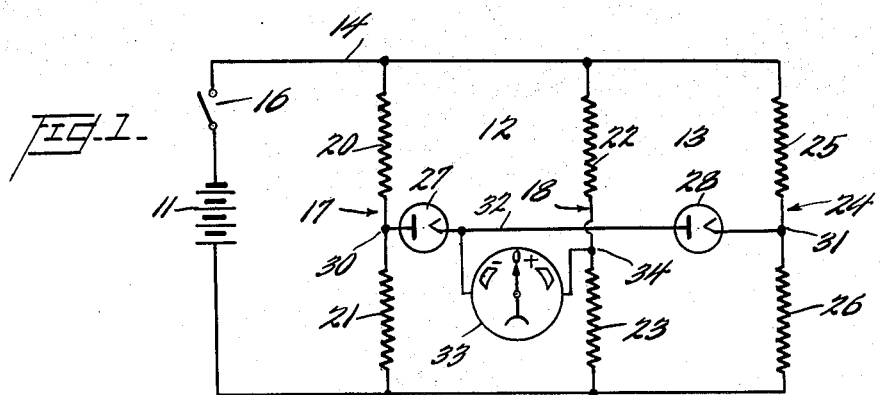
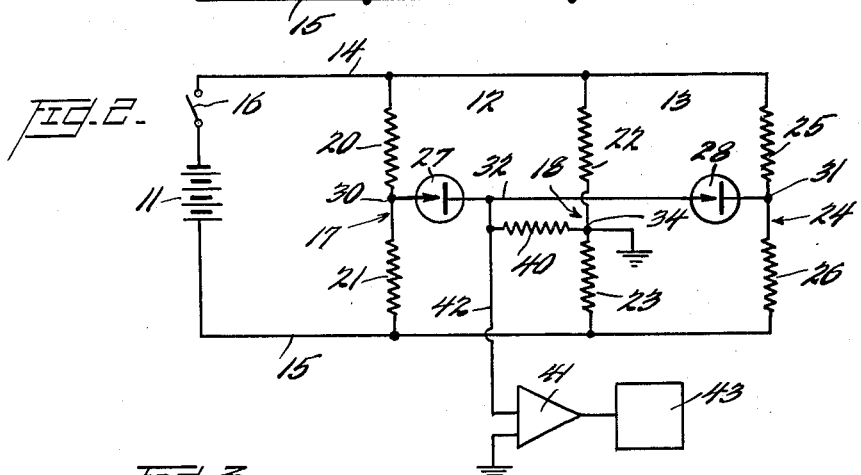
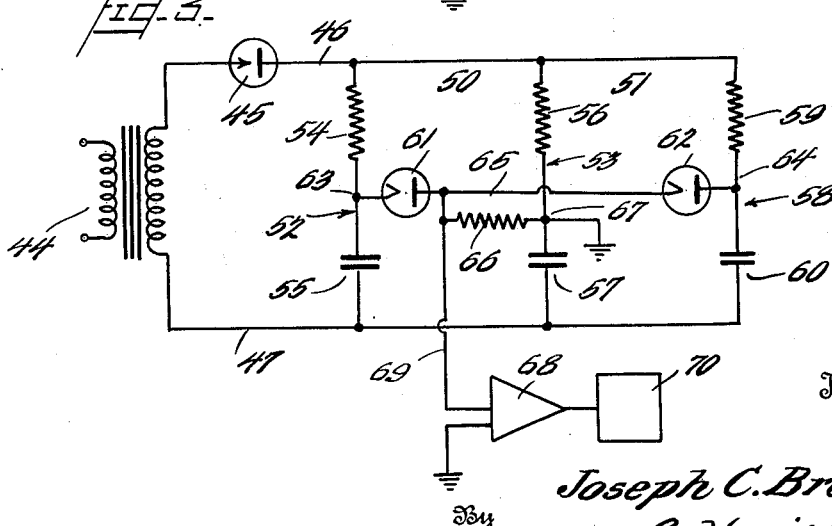
Inventor
Joseph C. Bregar;
C. B. Hamilton
By
ATTORNEY Patented Feb. 2, 1954

2,667,970

UNITED STATES PATENT OFFICE 2,667,970

AUTOMATIC LIMIT BRIDGE

Joseph C. Bregar, Winston-Salem, N. C., assignor to Western Electric Company, Incorporated, New York, N. Y., a corporation of New York Application September 1, 1948, Serial No. 47,202

7 Claims. (Cl. 209—81)

This invention relates to automatic limit bridges and more particularly to a limit bridge circuit comprising two conventional Wheatstone bridges electrically separated by two rectifier units, which is used for tolerance testing circuit elements.

In the past, attempts have been made to utilize two separate Wheatstone bridges wherein an element to be tested was connected in common with the two bridges. One of the bridges contained a standard low limit resistance arm, the other bridge contained a standard high limit resistance arm. The two bridges were then balanced so that current responsive indicating means connected across each of the bridge circuits would indicate an unbalance in either of the bridges in the event that the element to be tested did not fall within the required tolerance range. This method of testing necessarily involved rather tedious adjustment of each of the bridges inasmuch as the current flowing through the common arm containing the element to be tested was a combination of the currents from each of the two bridges. A further disadvantage encountered by the use of this method was that it required two indicating means which had to be correlated in some manner in order that a single indication would be given as to the acceptability of the tested element.

Accordingly, one object of this invention is to provide a completely automatic double bridge for tolerance testing circuit elements wherein only one of a connected pair of high and low limit bridges passes a current at any one time through a single indicating means connected to both of the bridges to give an indication of the magnitude of the element under test.

With this and other objects in view, the invention comprises a pair of Wheatstone bridges having two arms connected in common, one of which contains the element to be tested. A single indicating means is connected from a point common to both bridges through a pair of rectifiers to a midpoint in each of the bridges so as to provide a means for selectively reading only the voltage unbalance in one of the bridges.

Other advantages and objects will be apparent from a consideration of the drawings in which:

Fig. 1 is a schematic circuit diagram showing the principal embodiment of the invention;

Fig. 2 is a schematic circuit diagram of a modified form of the invention which is adapted to be utilized with an automatic sorting machine;

Fig. 3 is a schematic circuit diagram of the invention which has been adapted to function as an impedance bridge for testing capacitors and inductors.

Referring now to Fig. 1, a battery 11 is connected across a pair of Wheatstone bridges 12 and 13 by means of conductors 14, 15 and a switch 16. This battery supplies the bridge circuits with the necessary current for conducting a test. The first bridge 12 comprises four resistance arms which are serially connected in groups of two across the battery 11 to provide a pair of parallel current branches 17 and 18. The first branch 17 contains a fixed resistor 20 and a fixed standard low tolerance limit resistor 21. The second current branch 18 contains a fixed resistor 22 which is the same size as the resistor 20 and a resistor 23 which is to be tested.

The second Wheatstone bridge 13 comprises four resistance arms which are serially connected in groups of two across the battery 11 to provide a pair of parallel current branches 18 and 24. The current branch 18 is the same branch as that described in conjunction with the Wheatstone bridge 12. The current branch 24 contains a fixed resistor 25 which is equal in size to the resistors 20 and 22, and a fixed standard high tolerance limit resistor 26.

A pair of rectifiers 27 and 28 of any suitable type, such as a metallic or vacuum tube type rectifier, are serially connected between a midpoint junction 30 of the resistors 20 and 21 and a midpoint junction 31 of the resistors 25 and 26 through a conductor 32. A current responsive member 33 is connected between the conductor 32 and a midpoint junction 34 of the resistors 22 and 23. The rectifying means 27 and 28 electrically separate the bridges 12 and 13 inasmuch as current from only one of the bridges is allowed to flow through the meter 33 at any one time.

In the case where the resistor 23 is lower in value than the low limit value of the tolerance range represented by the resistor 21, the resistors 20 and 22 being equal, the resistor 23 will develop a voltage which is smaller in value than the voltage developed across the limit resistor 21. In this manner, the potential at the junction point 30 becomes higher in value than the potential at the junction point 34, thus a current will flow through the rectifier 27 and the directly connected meter 33 to give a visible indication that the resistor 23 is below the required tolerance range. Inasmuch as the high limit resistor 26 is larger in magnitude than the low limit resistor 21, the potential at the junction point 31 is higher than the potential at the junction point 34, thus the rectifier 28 cannot conduct and the current flowing through the meter 33 is solely the current flowing from the bridge 12. Since the deflection on the meter 33 is proportional to the flow of current therethrough, the amount by which the resistor is below the tolerance limit will also be indicated.

When the resistor 23 being tested is larger than the value of the high limit of the tolerance range represented by the resistor 26, the resistors 22 and 25 being equal, the voltage developed across the resistor 23 will be higher in value than the voltage developed across the resistor 26. In this manner the junction point 34 will be at a higher potential than the junction point 31, therefore, a current will flow through the rectifier 28 and the directly connected meter 33 to give an indication that the value of the resistor 23 is larger than the high tolerance limit. Since the resistor 23 is larger than the high limit resistor 26, it is also larger than the low limit resistor 21, thus the potential at the junction point 34 is also larger than the potential at the junction point 30. Therefore, the rectifier 27 will not conduct and the current flowing through the meter 33 will be entirely provided by the bridge 13. Since the direction of flow of current through the meter 33 is opposite to that of the current flow when the resistor 23 is too small, the meter 33 will deflect in a direction opposite to the deflection when the resistor 23 is too small thus providing a means for distinguishing between the high limit and low limit rejections.

When the size of the resistor 23 is within the tolerance range, the resistor 23 will be larger than the resistor 21 and smaller than the resistor 26 so that the voltage developed across the resistor 23 will be correspondingly larger than that developed across the resistor 21 and smaller than that which is developed across the resistor 26. In this manner, the potential at the junction point 34 will be larger than the potential at the junction point 30 and smaller than the potential at the junction point 31 with the result that neither of the rectifiers 27 and 28 will conduct. Accordingly, there will not be an indication on the meter 33 and the resistor 23 being tested will not be rejected.

The modified system shown in Fig. 2 includes a biasing resistor 40 which is connected between the conductor 32 and the junction point 34, now grounded, in place of the current responsive meter 33. The currents produced in the manner described hereinbefore which now flow through the resistor 40 produce a varying voltage which is supplied to a direct current amplifier 41 through a conductor 42. This voltage is amplified by the amplifier 41 for use in controlling an automatic sorting machine which separates the resistors into tolerance groups according to the voltage received from the resistor 40. In this manner, the machine 43 separates the resistors into three groups, namely; an acceptable group of resistors falling within the tolerance range, a rejected group of resistors falling below the tolerance range, and a second rejected group in which the resistors are larger in size than the high limit of the tolerance range.

Fig. 3 shows another modified form of the invention which is adapted to test the tolerance characteristics of impedance elements. Although the circuit shown is adapted to test capacitors, the circuit can be modified for testing inductors by replacing the test element and the standard limit elements with similar inductors and reversing the polarity of a pair of rectifiers 61 and 62.

In the circuit shown in Fig. 3, a transformer 44 is provided for applying an alternating current to a rectifier 45 causing a pulsating direct current to be conducted through a pair of conductors 46 and 47 to a pair of impedance bridges 50 and 51. The first impedance bridge 50 comprises a pair of parallel current branches 52 and 53 which are connected across the power supply leads 46 and 47. The branch 52 consists of a serially connected fixed resistance arm 54 and a standard low tolerance limit capacitor 55. The current branch 53 consists of a serially connected fixed resistance arm 56, which is equal to the value of the resistor 54, and a capacitor 57 to be tested. The second impedance bridge 51 comprises two parallel current branches 53 and 58 which are also connected across the conductors 46 and 47. The current branch 58 consists of a serially connected fixed resistance arm 59, which is equal in value to each of the resistors 54 and 56, and a fixed standard tolerance high limit capacitor 60. The current branch 53 which is connected in common with both of the bridges 50 and 51 is described in conjunction with the description of bridge 50. The rectifiers 61 and 62 are serially connected between a midpoint 63 of the branch 52 and a midpoint 64 of the branch 58 through a conductor 65. A fixed resistor 66 connects the conductor 65 to a midpoint 67 of the branch 53.

The operation of the bridges 50 and 51 is the same as that described in conjunction with Figs. 1 and 2 with the exception that the rectifiers 61 and 62 are reversed in polarity from the rectifiers 27 and 28 shown in Figs. 1 and 2. This change of polarity is made necessary by the fact that the impedances and hence the voltages on the midpoints 63, 64 and 67 vary inversely with the magnitude of the capacitors 55, 57 and 60. In the previous described circuits, only resistive elements in which the voltage varies directly with the magnitude of the element were being tested. It would be necessary to reverse the polarity of the rectifiers 61 and 62 shown in Fig. 3 in the event that inductance elements were to be tested inasmuch as the impedance and consequently the voltage across inductors varies directly with the size of the inductive element.

The varying voltage developed across the resistor 66 in accordance with the principle of the invention may be applied to a direct current amplifier 68 through a conductor 69. The amplified voltage from the amplifier 68 may be used to energize any suitable type of automatic sorting machine 70 whereby the tested elements may be separated into known tolerance groups.

In operation, before any tests are made, the proper high and low limit elements are selected and connected in the circuit. Following this, an element to be tested is connected into the correct position in the common arm of the two bridges. With the element to be tested in the circuit, it is only necessary to read the meter for an indication of the size of the element under test. The element may then be manually placed in the proper tolerance group or, as in the modified systems, the element will be automatically shunted into the proper tolerance group by the machine 43 or 70. Therefore, it is only necessary for the test operator to place the element in momentary contact with the bridge arm in order to gain an automatic indication of the size of the element. Thus in this manner, it is possible to test a large number of elements in a very short period of time.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A system for automatically testing a circuit element for certain requisite tolerance characteristics comprising a source of current, a first Wheatstone bridge energized by said current source, said first bridge having a first detecting current junction, a second Wheatstone bridge energized by said current source simultaneously with said first bridge and having two arms connected in common with the first Wheatstone bridge, one of said common arms containing the element to be tested, said second bridge having a second detecting current junction, an indicating means connected to the junction of the common arms through a first terminal, and rectifying means selectively connecting a second terminal of the indicating means to the first and second detecting current junctions for providing the indicating means with a current from one of the bridges to produce an indication of a characteristic of the element under test.

2. A system for automatically testing circuit elements for certain requisite tolerance characteristics comprising a source of current, a pair of Wheatstone bridges having two common arms, one of the common arms containing an element to be tested, each of said bridges having a detecting current junction, a pair of rectifying means connected to and selectively separating the two detecting current junctions, and a common indicating means connected from a point between the pair of rectifying means to the junction of the common arms for providing an indication of a characteristic of the element under test.

3. A system for automatically testing circuit elements for certain requisite tolerance characteristics comprising a source of current, a first Wheatstone bridge energized by said source and including an element to be tested and a standard low limit branch, said low limit branch having a detecting current junction, a second Wheatstone bridge energized by said source simultaneously with said first bridge and including a standard high limit branch and having another branch including the element to be tested connected in common with the first Wheatstone bridge, said high limit branch having a detecting current junction, and an indicating means including a plurality of rectifiers serially connected between the detecting current junctions and the element to be tested whereby a single unidirectional current is applied to the indicating means for determining the classification of the element in the tolerance range.

4. A system for testing circuit elements for certain requisite tolerance characteristics comprising a source of current, a first resistor and a low limit resistor connected across said current source, a second resistor equal in value to the first resistor and a resistor to be tested serially connected across said current source, a third resistor equal in value to the first resistor and a high limit resistor serially connected across said current source, a pair of rectifiers serially connected between the high limit resistor and the low limit resistor, and an indicating means connected from a point between the two rectifiers to the junction of the second resistor and the resistor to be tested for detecting voltage unbalance across either of the high or low limit resistors.

5. In a system for tolerance testing circuit elements in succession and sorting them into low, high and satisfactory classifications, a source of current, a low limit bridge connected in parallel with the current source, a high limit bridge connected in parallel with the current source, said bridges having two arms connected in common, one of the common arms containing the circuit element to be tested, an indicating means connected through its first terminal to the junction of the said common arms, and rectifying means selectively connecting a second terminal of the indicating means to other junction points of the low and high limit bridges to permit flow of current through the indicating means from only one of the bridges at any one time.

6. In a system for successively testing and sorting resistor elements into low, high and satisfactory classification groups, a source of current, a first resistor and a low limit resistor connected across said current source, a second resistor equal in value to the first resistor and a resistor to be tested serially connected across said current source, a third resistor equal in value to the first resistor and a high limit resistor serially connected across said current source, a pair of rectifiers connected in series between the low limit resistor and the high limit resistor, a fourth resistor connected at a point between the two rectifiers to the junction of the second resistor and the resistor to be tested, an amplifier connected to the fourth resistor, and a sorting device connected to and controlled by the amplifier for separating the tested resistor elements into the said three classification groups.

7. In a system for successively testing and sorting impedance elements into low, high, and satisfactory classification groups, a source of current, a first resistor and a low-limit impedance connected across said current source, a second resistor equal in value to the first resistor and an impedance to be tested serially connected across said current source, a third resistor equal in value to the first resistor and a high-limit impedance serially connected across said current source, a pair of rectifiers connected in series between the low-limit impedance and the high-limit impedance, a fourth resistor connected at a point between the two rectifiers to the junction of the second resistor and the impedance to be tested, an amplifier connected to the fourth resistor, and a sorting device connected to and controlled by the amplifier for separating the tested impedance elements into the said three classification groups.

JOSEPH C. BREGAR.

References Cited in the file of this patent

UNITED STATES PATENTS

| Number | Name | Date |
| --- | --- | --- |
| 1,985,095 | Hoare | Dec. 18, 1934 |
| 2,033,465 | Graham | Mar. 10, 1936 |
| 2,283,072 | Leathers | May 12, 1942 |
| 2,456,499 | Fritzinger | Dec. 14, 1948 |
| 2,468,625 | Goetz | Apr. 26, 1949 |
| 2,505,072 | Sunstein | Apr. 25, 1950 |